Patented Mar. 9, 1954

2,671,771

UNITED STATES PATENT OFFICE 2,671,771

EPICHLORHYDRIN-SULFONAMIDE RESINS

John Kenson Simons, Toledo, Ohio, assignor, by mesne assignments, to Allied Chemical & Dye Corporation, New York, N. Y., a corporation of New York No Drawing. Application May 7, 1948, Serial No. 25,792

10 Claims. (Cl. 260—49)

The invention relates to thermosetting synthetic resins, and more particularly to thermosetting sulfonamide resins.

A thermosetting synthetic resin is a composition that exists successively in two different states: first in a fusible state and then in an infusible state. When it is in its fusible state, a thermosetting synthetic resin is capable of being converted or cured to its infusible state, for example, by the action of heat or a catalyst.

The thermosetting or curable sulfonamide resins heretofore known have been produced by the reaction of a sulfonamide with formaldehyde. A very important deficiency of thermosetting sulfonamide resins prepared by the reaction of a sulfonamide with formaldehyde is the slowness with which they cure to the infusible state. The slowness with which thermosetting formaldehyde-sulfonamide resins cure has been an insuperable obstacle in attempts to commercialize such resins, and such resins have not gone into substantial commercial use.

The principal object of the invention is to provide a novel fast-curing sulfonamide resin. More specific objects and advantages are apparent from the description, which discloses and illustrates but does not limit the scope of the invention.

A sulfonamide resin embodying the invention comprises a reaction product of epichlorohydrin with a sulfonamide whose molecule has at least three hydrogen atoms each attached to a sulfonamide nitrogen atom.

The present invention is based upon the discovery that such a sulfonamide resin is fast-curing.

The fast-curing sulfonamide resins of the invention are produced by means of a reaction between epichlorohydrin and a sulfonamide which may have the general formula

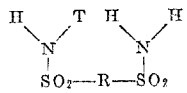

in which R is a divalent aromatic or aliphatic or cycloaliphatic hydrocarbon radical, and T is hydrogen or a monovalent aromatic or aliphatic radical.

R may be a divalent radical which can be considered to be derived (by the removal of two hydrogens, one from each of two non-adjacent carbon atoms) from the molecule of a straight or branched chain, saturated or unsaturated aliphatic hydrocarbon having from 3 to 18 carbon atoms. Thus, R may be derived from propane, propene, either butane, any butene, or any alkane or unsaturated aliphatic hydrocarbon having from 5 to 18 carbon atoms.

R also may be a divalent radical which can be considered to be derived (by the removal of two hydrogens, one from each of two carbon atoms) from the molecule of a cycloalkane. R may be derived from cyclopentane, cyclohexane, or an alkylated cyclopentane or cyclohexane, or from a derivative of a cycloalkane in which two carbon atoms in the ring of cyclopentane or cyclohexane or an alkylated cyclopentane or cyclohexane are common to the ring of another such cycloalkane. When R is such a radical that it can be considered to be derived from an alkylated cyclopentane or cyclohexane, the alkyl radicals on each ring may be methyl or ethyl and may be from one to two in number. The free valences are not attached to the same carbon atom or to adjacent carbon atoms in an alkyl side chain.

R also may be a divalent radical derived by the removal of two hydrogens from the molecule of an aromatic hydrocarbon. When R is derived from an aromatic hydrocarbon it is usually economically desirable that it be derived from benzene, naphthalene, an alkylated benzene or an alkylated naphthalene. When R is derived from a mono-alkyl benzene it is usually not advantageous that the alkyl group have more than 18 carbon atoms. Also it is desirable that the alkylated benzene have no more than four alkyl groups; or, if more than one alkyl group, that the total number of carbon atoms in each molecule of the alkylated benzene not exceed 14. When the alkylated benzene has from two to four alkyl groups, it may have a total of from 8 to 14 carbon atoms (i. e., all the alkyl groups may contain a total of from 2 to 8 carbon atoms); the alkyl groups may be any combination of from two to four alkyls so long as the total number of carbon atoms in these groups does not exceed 8. Each alkyl group may be in any position (i. e., attached to any nuclear carbon atom). When R is derived from an alkylated naphthalene it may have from one to two alkyl radicals each of which is methyl or ethyl. Each methyl or ethyl radical may be bonded to any nuclear carbon atom that is not attached to a sulfonamide group. If a sulfonamide group is attached to a carbon atom in one of the side chains of an alkylated benzene or an alkylated naphthalene, no adjacent carbon atom in that side chain should be attached to another sulfonamide group, and not more than one sulfonamide group should be attached to any one carbon atom in a side chain.

R also may be a divalent radical derived from an ether. The ether from which R is derived may be a dialkyl ether, a dialkyl ether of ethylene glycol, a diaryl ether or an alkyl-aryl ether. Each alkyl radical of the dialkyl ether or the dialkyl ether of ethylene glycol may have from two to four carbon atoms. Each aryl group of the diaryl ether or alkyl-aryl ether may be phenyl or an alkyl phenyl radical. When the aryl group is an alkyl phenyl radical it may have one or two side chains each of which consists of an alkyl radical having one or two carbon atoms. The alkyl radical of the alkyl-aryl ether is one having from one to five carbon atoms. It is much easier to prepare a sulfonamide in which sulfur is attached to the aromatic group of such an ether, so this type of sulfonamide is preferable (for economic reasons) to that in which the sulfonamide group is attached to the alkyl group in such an ether.

R also may be derived from an ether of the general type E—O(—$t$—O)$_n$—E' in which $n$ is an integer from 1 to 3, $t$ is any alkylene radical having from 2 to 18 carbon atoms and each of the radicals E and E' is an aryl radical having one or two benzene nuclei (i. e., phenyl, naphthyl or biphenyl).

R also may be derived from biphenyl, from diphenyl methane, from diphenyl ethane, or from a diphenyl alkane of unknown structure produced by reacting a dichlorinated kerosene with benzene.

The preferred resins of the invention are those in which R is a radical derived from an aromatic hydrocarbon, and in which the sulfonamide groups are attached to nuclear carbon atoms. ("Sulfonamide group" as used herein means the radical

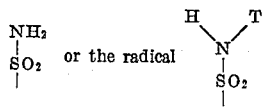

in which T has the meaning hereinbefore set forth, so that, when a sulfonamide group is attached to a nuclear carbon atom, a sulfonamide nitrogen atom is connected by an SO$_2$ group to a nucleus.)

The most preferred resins of the invention are those in which R is derived from an ether containing at least one aromatic nucleus, and in which the sulfonamide groups are attached to nuclear carbon atoms, preferably in different aromatic nuclei. Most desirably, the two sulfonamide groups are attached to different aromatic nuclei, which are connected through a divalent radical consisting of or containing at least one ether linkage.

Preferred resins are also produced from sulfonamides in which R is derived from diphenyl, or an alkylated diphenyl having from one to two side chains each of which is methyl or ethyl. Most desirably, the two sulfonamide groups are attached to different nuclei.

T is a monovalent radical which can be considered to be derived by the removal of one hydrogen from the molecule of a straight or branched chain, saturated or unsaturated aliphatic hydrocarbon such as methane, ethane, propane, propene, either butane, any butene, or any alkane or unsaturated aliphatic hydrocarbon having from 5 to 18 carbon atoms. The monovalent radical (T) which replaces hydrogen also may be one derived by the removal of one hydrogen from an aromatic hydrocarbon such as benzene, naphthalene, an alkylated benzene or an alkylated naphthalene. An alkylated benzene from which T is derived may have from one to four alkyl radicals, no one of which has more than 18 carbon atoms; if there are two or more alkyl radicals, the total number of carbon atoms in each alkyl benzene is from 8 to 14 (i. e., all the alkyl substituents contain a total of from 2 to 8 carbon atoms) as hereinbefore described. When the aryl radical is derived from an alkylated naphthalene it may have from one to two alkyl radicals, each of which is methyl or ethyl, as hereinbefore described.

The resins of the invention may be prepared by a reaction between epichlorohydrin and a disulfonamide alone, or in the presence of a second compound which reacts with epichlorohydrin. It is believed that the significant reaction which occurs between these compounds in the practice of the invention is between hydrogen and the epoxy group (i. e., the group

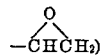)

and that a secondary alcohol is formed as a product of this reaction. Compounds that are useful in the practice of the invention in that they undergo this reaction with the epoxy group can be represented by the formula H—A, in which A is the residue that would be formed by removal of a hydrogen from a sulfonamide or a dihydric phenol (i. e., H—A represents a sulfonamide or a dihydric phenol). The reaction which is believed to occur between the epoxy group of epichlorohydrin and a compound having the general formula H—A is shown in Equation 1, below:

(1) 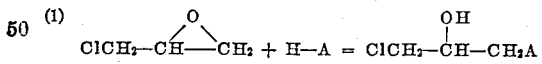

It has been found that the product of a reaction corresponding to Equation 1, when treated with a strong base, yields a compound containing an epoxy group; this reaction is believed to proceed according to Equation 2, below:

(2) 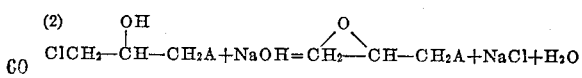

The epoxy compound produced by a reaction corresponding to Equation 2 can then be reacted with a substance having the formula H—A'; it is believed that the epoxy group undergoes a reaction similar to that represented in Equation 1 to produce a compound having a general formula corresponding to Formula 3, below:

(3) 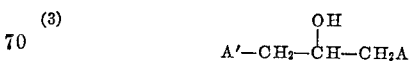

Useful resins are produced by conducting such reactions between one or more disulfonamides and epichlorohydrin alone. Thus, in the case of the foregoing disulfonamide the reaction which produces a thermosetting resin is believed to proceed according to Equations 4, 5, 6 and 7, below:

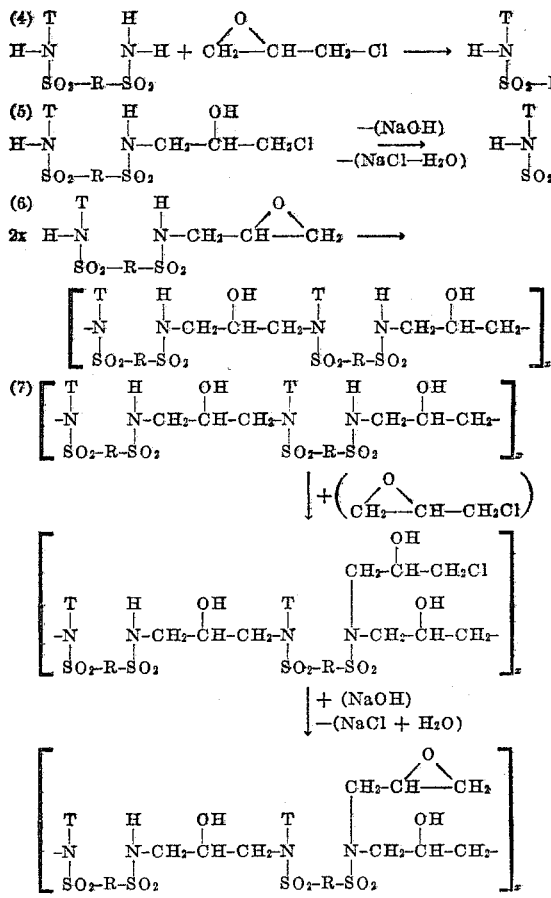

It is, of course, to be understood that the foregoing equations do not represent the precise sequence in which the reactions take place, but instead represent merely the reactions which must necessarily take place in the formation of a condensation product of the invention. Thus, the additional epichlorohydrin molecule shown in Equation 7 may replace a sulfonamide hydrogen atom before, during or after the reaction represented by Equation 4, 5 or 6, instead of during the reaction represented by Equation 7. Also, the conversion of the gamma-chloro-beta-hydroxypropyl (—CH₂—CHOH—CH₂Cl) radicals to 2,3-epoxypropyl

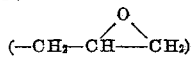

radicals, as represented in Equation 7, may not take place completely during the formation of the thermosetting condensation product, since a noticeable amount of chlorine is often found to be present in the condensation product. In any event, it is apparent that in the condensation product, as shown in Equation 7, the radicals connected to the sulfonamide nitrogen atoms of the disulfonamide constituents may comprise (1) a monovalent hydrocarbon (T) radical, and always comprise (2) some hydrogen radicals, (3) some radicals having the formula

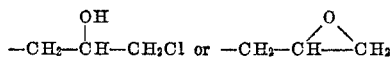

depending on whether or not the conversion of the former radical to the latter radical has been completed and (4) radicals having the formula

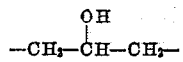

which satisfy the remainder of the valences of the sulfonamide nitrogen atoms in the disulfonamide constituents, and which connect together such constituents.

The condensation product of Equation 7 is a thermosetting product and is, therefore, an essentially linear polymer as contrasted to a thermoset, three-dimensional polymer. The thermosetting condensation product thus contains an insufficient number of radicals of the formula

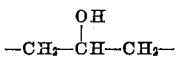

to render the product infusible, although it preferably contains a sufficient number of such radicals to render the product insoluble in the aqueous alkali reaction mix (the number of such radicals in the product being an indication of the molecular weight).

The thermosetting product is a linear, chain-like polymer that comprises recurring units having the formula

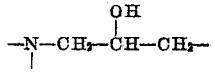

but is characterized more particularly by the fact that each of the two sulfonyl radicals of each disulfonamide constituent is connected directly to a sulfonyl radical in another disulfonamide constituent by a radical having the formula

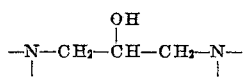

The reaction involved in converting the condensation product of Equation 7 to an infusible, thermoset resin may be represented by Equation 8 below:

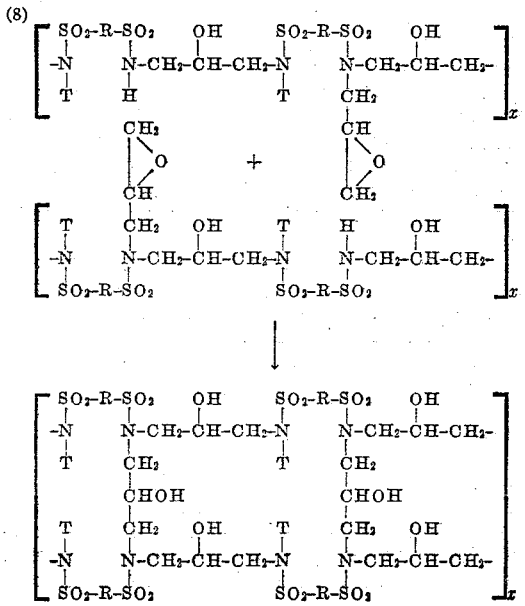

It is thus seen that in the infusible resin the epichlorohydrin constituent has the formula

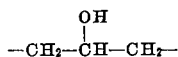

forming a bridge in the polymer structure directly connecting two sulfonamide nitrogen atoms by replacement of a hydrogen atom on each of such nitrogen atoms, and replacing at least three of such hydrogen atoms per sulfonamide molecule.

Referring to the generic Equations 1, 2 and 3, it can be seen that because the disulfonamides used in the practice of the invention have at least three hydrogen atoms which will react with the epoxy group of epichlorohydrin, such reactions produce cross-linked molecules comprised of repeating units having the formula

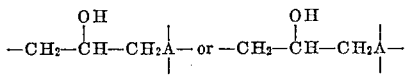

It is sometimes desirable to produce modified resins by conducting such a reaction between epichlorohydrin and a mixture composed of one or more disulfonamides and one or more of the other substances (such as monosulfonamides) represented by the formula H—A, hereinbefore described. Useful modified resins of the invention can be produced in this way when the mixture of disulfonamides and other substances represented by the formula H—A comprises from about 50 mol per cent of disulfonamides to about 95 mol per cent of disulfonamides. As is indicated by Formula 3, above, each molecule of the resins of the invention is made up, in part, of secondary carbon atoms to which are attached hydroxyl groups. In some instances, it is desirable to modify the resins of the invention by means of a reaction which involves these hydroxyl groups.

Modifying the resins through these reactive OH groups results in useful compositions. For example, in some instances it is possible to produce air-drying resins by reacting an epichlorohydrin-sulfonamide resin with linseed oil acids, or mixtures of eleostearic acid and other less unsaturated acids. The epichlorohydrin-sulfonamide resins can also be modified by means of a reaction with phthalic acid or phthalic anhydride or with other saturated or unsaturated dicarboxylic acids such as maleic acid, itaconic acid, citraconic acid, oxalic acid and adipic acid, and other substances such as acetic anhydride, isocyanates, di-isocyanates and the like.

The resins of the invention can also be modified by means of an agent that will react with residual epoxy groups. Such agents include amines, preferably diamines. The most desirable are aliphatic amines such as triethylenetetramine, diethylenetriamine and hexamethylenediamine.

Sulfonamides that may be reacted with epichlorohydrin to produce resins of the invention include diethyl ether-2,2'-disulfonamide, m-benzene disulfonamide, diphenyl ether-4,4'-disulfonamide, 1,2-diphenoxy ethane-4,4'-disulfonamide, alpha,beta-diphenoxy propane-4,4'-disulfonamide, di(2-phenoxyethyl) ether-4,4'-disulfonamide, pentane - 1,5 - disulfonamide, cyclohexane-1,4-disulfonamide, 4-methylbenzene-1,3-disulfonamides, naphthalene - 1,4 - disulfonamide, naphthalene - 2,6 - disulfonamide, naphthalene-2,7 - disulfonamide, biphenyl-4,4'-disulfonamide, diphenoxy triethylene glycol disulfonamides, 1-methoxybenzene-2,4-disulfonamide and 1-ethoxybenzene-2,4-disulfonamide.

Sulfonamides are usually prepared by means of a reaction between ammonia and a sulfonyl chloride. The procedure by which this reaction is conducted is illustrated by the following: di(2-phenoxyethyl) ether-4,4'-disulfonyl chloride (26 grams) is dissolved in chloroform (250 ml.) and ammonium hydroxide (100 ml. of 28 weight per cent aqueous solution) is added to this solution, with stirring. The sulfonamide precipitates during the course of the 30-minute reaction, and is separated by filtration. Pure di(2-phenoxyethyl) ether-4,4'-disulfonamide is obtained by dissolving the crude product in about 100 ml. of about 10 weight per cent sodium hydroxide and reprecipitating it by making the solution slightly acid with aqueous hydrochloric acid. Numerous other sulfonyl chlorides can be used to produce sulfonamides by means of this reaction, including:
(A) disulfonyl chlorides derived from benzene such as benzene-1,2-disulfonyl chloride, benzene-1,3-disulfonyl chloride, benzene-1,4-disulfonyl chloride, 4-ethylbenzene-1,3-disulfonyl chloride, 4 - methylbenzene - 1,2 - disulfonyl chloride, 2-methylbenzene-1,3-sulfonyl chloride, 4-methylbenzene-1,3-disulfonyl chloride, 5-methylbenzene-1,3-disulfonyl chloride, 2-methylbenzene-1,4-disulfonyl chloride, 1,2-dimethylbenzene-3,5-disulfonyl chloride, 1,3-dimethylbenzene-4,6-disulfonyl chloride, 1,3-dimethylbenzene-2,4-disulfonyl chloride, 1,4-dimethylbenzene-2,5-disulfonyl chloride, 1,4-dimethylbenzene-2,6-disulfonyl chloride, 1,4-dimethylbenzene-2,3-disulfonyl chloride, 1,3,5-trimethylbenzene-2,4-disulfonyl chloride, biphenyl-2,2'-disulfonyl chloride, biphenyl-3,3'-disulfonyl chloride, 4,4'-dimethylbiphenyl-2,2'-disulfonyl chloride, 5,5'-dimethylbiphenyl-2,2'-disulfonyl chloride and diphenylmethane-4,4'-disulfonyl chloride.

Disulfonyl chlorides derived from naphthalene can also be used. Such sulfonyl chlorides include (B) naphthalene-1,3-disulfonyl chloride, naphthalene-1,4-disulfonyl chloride, naphthalene-1,5-disulfonyl chloride, naphthalene-1,6-disulfonyl chloride, naphthalene-1,7-disulfonyl chloride, naphthalene-2,6-disulfonyl chloride and naphthalene-2,7-disulfonyl chloride.

Disulfonyl chlorides derived from aryl-alkyl ethers can also be used to prepare such sulfonamides. Examples of these disulfonyl chlorides include (C) 2-ethoxynaphthalene-1,6-disulfonyl chloride, 2-ethoxynaphthalene - 3,6 - disulfonyl chloride, 2-ethoxynaphthalene - 6,8 - disulfonyl chloride, 1-methoxybenzene-2,4-disulfonyl chloride, 1-ethoxybenzene - 2,5 - disulfonyl chloride, 1 - ethoxybenzene - 2,4 - disulfonyl chloride and 1-methyl-3-methoxybenzene-4,6-disulfonyl chloride.

Alkane disulfonyl chlorides are produced less readily than are the corresponding aromatic compounds. However, alkane disulfonyl chlorides (from which can be produced alkane disulfonamides, as hereinbefore described) can be produced (by a reaction with phosphorus pentachloride) from disulfonates resulting from a reaction between sodium sulfite and a polymethylene bromide. These disulfonyl chlorides react normally with ammonia to form disulfonamides.

In the practice of the invention a disulfonamide first may be dissolved in an aqueous solution of a strong base. Epichlorohydrin is then added to the solution. Exothermic reaction usually proceeds at room temperature, but it is ordinarily desirable to heat the mixture (usually to a temperature not higher than about 100° C.). Separation of an oily layer from the water solution indicates resin formation. Heating is discontinued (usually after about 30 minutes) before the resin gels completely, and the resin is then separated from the water layer, e. g., by decantation or in a separatory funnel. The resin is next washed with water (preferably hot water). (If the resin is washed with an acid before the water wash, the resin is not curable.) The resin is then dried by heating on a hot plate while a stream of air or other gas is bubbled through it.

It is believed that epichlorohydrin and a disulfonamide participate in the reaction of the invention in a 2:1 molar ratio, and that epichlorohydrin and a sulfonamide having the formula

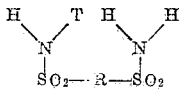

hereinbefore described participate in a 3:2 molar ratio, i. e., one gram mol of epichlorohydrin reacts for every two gram atoms of hydrogen attached to sulfonamide nitrogen atoms in the sulfonamide molecule. Reaction of a small excess of either ingredient is believed to limit the average molecular weight of the resins formed by the reaction, which is thought to proceed until so many of the reactive points are derived from the substance reacting in more than the ratio indicated above that further reaction does not occur. An inverse relationship is believed to obtain between the average molecular weight of the resin and the amount of the excess of either ingredients that has reacted, i. e., when a larger excess of either ingredient has reacted the average molecular weight of the resin is smaller, the maximum molecular weight being achieved by reaction of approximately the theoretical quantities indicated above. For economic reasons, as well as because it is usually desirable that resins of comparatively high molecular weight be formed, it is preferable that epichlorohydrin and the sulfonamide be reacted in approximately the theoretical proportions, it usually being desirable that any excess be epichlorohydrin. However, it has been found that satisfactory resins can be produced in the practice of the invention using as little as 0.5 mol of epichlorohydrin for every two gram atoms of hydrogen, and that satisfactory resins can be produced using as much as three mols of epichlorohydrin for every two gram atoms of hydrogen, although it is ordinarily not desirable to use more than about 2¼ mols or less than about ⅞ mol of epichlorohydrin for two gram atoms of hydrogen.

Epichlorohydrin and a sulfonamide can be reacted by simply mixing them and adding a basic material. However, if a base (such as pyridine) which is miscible with the sulfonamide-epichlorohydrin mixture is used the reaction does not produce the resins of the invention. It is believed that the product of such a reaction is a simple, monomeric, substituted amide, i. e., a product corresponding to that of Equation 1, above; such product is soluble in an aqueous solution of a strong base but becomes insoluble after reaction (which produces resins of the invention) in such medium for a short time. For this reason it is desirable to conduct the reaction in the presence of a strong base such as sodium hydroxide or potassium hyroxide or a quaternary ammonium hydroxide such as trimethylbenzyl ammonium hydroxide. It is most convenient to introduce the strong base as an aqueous solution; if sufficient base is used the sulfonamide goes into solution readily; in most instances, the sulfonamide and the epichlorohydrin both go into solution after a short time (the solution is believed to prevail while the product of the reaction is monomeric in form, i. e., has a formula corresponding to that representing the product of Equation 1, above); and then the resin begins to precipitate from the solution. Equation 2 indicates that epichlorohydrin and the base react in a 1:1 molar ratio. In some instances, qualitative tests on resins of the invention produced by a reaction using a molar ratio of epichlorohydrin to base greater than 1:1 indicate the presence of chlorine in these resins; this is thought to indicate the presence of units derived from a reaction corresponding to that represented by Equation 1, above.

When the reaction is conducted it is usually desirable that a strong base be present in such amounts that the molar ratio of epichlorohydrin to base is at least about 0.75, and it is usually preferable that the molar ratio of epichlorohydrin to base be at least about 1.0. Most desirably, the molar ratio of epichlorohydrin to base is not less than about 1.5. It is usually desirable that the ratio be not greater than about 4, and preferable that the ratio be not greater than about 2.5. Most desirably the ratio is not greater than about 2.25. Conducting the reaction in the presence of a large amount of a strong base yields a product having a comparatively high pH; since the more stable resins are those having a relatively low pH, it is desirable to use the least amount of strong base that gives a satisfactory product.

As is indicated above it has been discovered that useful resins of the invention can be produced by means of a reaction which involves epichlorohydrin, a disulfonamide and a strong base, and that the proportions in which the three reactants are used to produce these useful resins can be varied within comparatively wide limits. The most desirable resins of the invention are those which have the most advantageous combinations of the following:

1. Stability.
2. Rate of cure; and
3. Economy of production.

Some resins of the invention (e. g., resins K, L, M and N, whose preparation is described in the second paragraph of Example 4) can be used (e. g., as coating compositions) but their utility is limited because they are stable for only a comparatively short period of time so that they must be used soon after they are prepared. Other resins of the invention are useful (e. g., as coating or molding compositions), but their utility is limited because of their slow rate of cure. It is always desirable to produce useful products at the least possible necessary expense. It has been discovered that certain of the resins of the invention are particularly desirable because they are relatively stable compounds, having a comparatively rapid cure, and are less expensive to prepare than are less desirable resins of the invention.

These particularly desirable resins of the invention are prepared by reacting epichlorohydrin, a disulfonamide and a strong base in such proportions that the molar ratio of epichlorohydrin to base is not less than about 1.5 and not more than about 2.25, and that the mols of strong base reacted for every two gram atoms of hydrogen attached to sulfonamide nitrogen atoms are from about ⅞ to about 2¼. Resins produced by using the reactants in these quantities are found to be unexpectedly stable; they can be modified by means of alkaline agents as hereinafter described to produce rapid-curing materials. Since it is not necessary to use a substantial excess of either epichlorohydrin or the sulfonamide, these stable resins can be produced at minimum cost.

In the practice of the invention, the epichlorohydrin taking part in the reaction may be provided either by adding epichlorohydrin itself or by adding a substance which, under the conditions used, yields epichlorohydrin. For example, alpha, gamma-glycerol dichlorohydrin

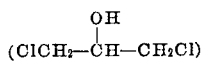

reacts in a 1:1 molar ratio with a strong base, as indicated by Equation 2, above, to produce epichlorohydrin. The epichlorohydrin, as fast as it is produced, may be reacted with a disulfonamide, as hereinbefore described. Thus, when alpha, gamma-glycerol dichlorohydrin is added to a disulfonamide instead of an equivalent amount of epichlorohydrin, an amount of a strong base within the range hereinbefore set forth is added to the reaction mixture, and (in addition) one mol of a strong base for each mol of alpha, gamma-glycerol dichlorohydrin. This additional strong base reacts with the alpha, gamma-glycerol dichlorohydrin to produce epichlorohydrin, which then reacts with the disulfonamide and the remaining strong base as hereinbefore described.

The reaction that produces resins of the invention is exothermic in nature and has been found to proceed at temperatures as low as about 25° C., usually causing an increase in temperature. It is ordinarily desirable that the reaction be conducted at temperatures not substantially greater than 100° C. It has been found that resins produced by means of a reaction conducted at a relatively high temperature are less stable than are resins produced from the same quantities of the same starting materials using a lower temperature. The decreased stability which results when the reaction is conducted at a higher temperature can be counteracted by using a higher molar ratio of epichlorohydrin to base. It is usually desirable, when a relatively high molar ratio of epichlorohydrin to base is used (e. g., from about 1.5 to about 2.0, or even 2.25), to conduct the reaction at a temperature as high as about 60° C. It is usually preferable to conduct the reaction at a temperature not higher than about 80° C.

After the resins of the invention have been washed with warm water until they are approximately neutral, they are sufficiently stable that small batches (e. g., not larger than about 200 grams) can be dried by heating on a hot plate until the water has vaporized. The resulting dried resins are soluble in glycol-monoethyl ether, glycol-monomethyl ether and dioxane, as well as in ketonic solvents such as acetone, methyl-ethyl ketone, mesityl oxide, diethyl ketone, ethyl-propyl ketones, dipropyl ketones, and the like. The resins of the invention can be made into molded pieces (e. g., by compression molding) or can be used as coating compositions.

When the resins of the invention are used as coting compositions they have excellent resistance to the action of glacial acetic acid, being apparently unaffected after contact with this material for a period of 24 hours. Water has an effect on such coatings similar to the effect of dilute aqueous caustic solution, each seeming to decrease the adhesion between the film and the underlying surface. The resistance of these films to water or aqueous caustic solution can be increased by applying a primer coating of a pigmented alkyd resin. An example of such a primer coating is set forth in Example 9.

The rate of cure of the resins of the invention can be increased by treating them with basic materials such as potassium hydroxide, sodium hydroxide, piperazine, piperidine, sodium in glycol-monoethyl ether (6 grams of sodium per 90 cc. of glycol-monoethyl ether), diethylenetriamine and hexamethylenediamine. It may be advantageous to use as little as 0.1 weight per cent of the basic material, but it is usually not desirable to use more than about 5 weight per cent of the basic material. The rate of cure is increased more by the presence of a larger amount of a basic material.

EXAMPLE 1

A curable (i. e., thermosetting) resin is prepared by means of a reaction between epichlorohydrin and a disulfonamide according to the following procedure:

A disulfonamide (2.3 grams of diethyl ether-2,2'-disulfonamide) is dissolved in an aqueous solution of a strong base (5 cc. of 20 weight per cent aqueous sodium hydroxide diluted with 15 cc. of water) and epichlorohydrin (3.6 grams) is added. The mixture is warmed on a steam bath to a temperatur between about 60° C. and about 70° C. (when a homogeneous solution is obtained), and the liquid is held at a temperature within this range for about 10 minutes. The partially gelled resin which separates from the solution as the reaction proceeds is separated from the aqueous layer (e. g., by decanting the water). The separated resin is washed with hot water. A sample of this resin on a hot plate softens at a temperature between about 130° C. and about 140° C. and then cures rapidly.

The procedure of the preceding paragraph is repeated using 0.08 gram of sodium hydroxide in 3 cc. of water, 0.37 gram of epichlorohydrin and (instead of the diethyl ether disulfonamide) 0.39 gram of 1,2-diphenoxypropane-4,4'-disulfonamide. The mixture of these ingredients is heated on a water bath to a temperature between about 50° C. and about 60° C. and is held at that temperature for about 30 minutes. A sample of the resin fuses on a hot plate and then cures.

The procedure of the preceding paragraph is repeated using, instead of the 1,2-diphenoxypropane-4,4'-disulfonamide, 0.41 gram of di-(2-phenoxyethyl) ether-4,4'-disulfonamide. The dried resin fuses on a hot plate and then cures.

1,2-diphenoxyethane - 4,4' - disulfonamide (3.7 grams), aqueous NaOH (6 cc. of 20 weight per cent aqueous NaOH diluted with 25 cc. of water) and epichlorohydrin (3.6 grams) are mixed and warmed on a steam bath. When the temperature reaches about 60° C. a single phase solution is formed and an oily resin begins to precipitate almost immediately. This oily resin becomes rubbery when the mixture reaches a temperature between about 75° C. and about 80° C. (about ten minutes after resin precipitation starts). The resin is then separated and washed with hot water. It is solid at room temperature and softens (at about 150° C.) on a hot plate before curing to an infusible product.

EXAMPLE 2

Epichlorohydrin-m-benzene disulfonamide resins are prepared according to the following procedures:

Epichlorohydrin (1.85 grams), m-benzene disulfonamide (2.36 grams) and sodium hydroxide (0.8 gram in 8 cc. of water) are mixed. The m-benzene disulfonamide is soluble at room temperature. The material is then heated to a temperature between about 70° C. and about 80° C. (at which temperature resin precipitates from the solution) and is held at a temperature within this range for about 10 minutes. The resin is separated (e. g., by decantation) and washed with hot water. The resin fuses on a hot plate and then cures to an infusible material; it forms a clear solution in glycol-monomethyl ether, which solution can be filmed and cured by heating at 140° C. for about 15 minutes to produce a transparent film, insoluble in glycol-monomethyl ether.

For purposes of comparison, the following procedure is carried out: Epichlorohydrin (0.93 gram), m-benzene disulfonamide (2.36 grams) and sodium hydroxide (0.4 gram in 4 cc. of water) are mixed and heated until a single-phase solution is formed at a temperature between about 60° C. and about 70° C. The temperature is maintained within the above-mentioned range for about 10 minutes, during which time resin precipitates from the solution. The resin is separated, and washed as described in the preceding paragraph. The resin softens on a hot plate but does not cure.

A sample of the resin produced by the procedure described in the first paragraph of the example, after being dried at room temperature for 24 hours, is molded in a compression press using a total pressure of 2,750 pounds. A five-cavity button mold (mold temperature about 300° F.) is used, but the material is placed in only one cavity. The molding which results from about a 15-minute cure (about 0.7 inch in diameter and about 0.05 inch thick) is rubbery at mold temperature and hard at room temperature.

EXAMPLE 3

Epichlorohydrin-diphenyl ether-4,4'-disulfonamide resins are prepared according to the following procedure:

Epichlorohydrin (3.70 grams), diphenyl ether-4,4'-disulfonamide (6.56 grams) and sodium hydroxide (1.6 grams in 32 cc. of water) are mixed and warmed to a temperature between about 60° C. and about 64° C. Heat evolved by the exothermic reaction raises the temperature to about 70° C. and resin begin to separate from the solution. The temperature is maintained at about 70° C. for about 5 minutes after which time the resin is separated, washed and dried as described in the first paragraph of Example 2. The resulting resin is a hard solid at room temperature and a perfectly clear, nearly colorless melt at 100° C. continued heating of the resin converts it to an infusible mass. A 50 weight per cent solution of the resin in glycol-monomethyl ether has a Gardner-Holdt viscosity of B.

Films of the 50 weight per cent glycol-monomethyl ether solution prepared by the procedure of the preceding paragraph are cured by heating at 300° F. for about 30 minutes. These films are transparent, nearly colorless and resistant to solvents. Such a film is compared with a film from a commercial urea-formaldehyde coating composition by subjecting the two films to a temperature of 200° C. for about 8 hours. The film from the sulfonamide resin shows less cracking and discoloration than does the film from the urea resin.

Diphenyl ether - 4,4' - disulfonamide (3.28 grams) is dissolved in a sodium hydroxide solution (0.8 gram of sodium hydroxide in 4 cc. of water); glycol-monomethyl ether (12 cc.) and epichlorohydrin (3.70 grams) are added. The resulting mixture is heated to a temperature between about 105° C. and about 120° C. and its temperature is maintained within this range for about 75 minutes (the amide goes into solution about 15 minutes after heating is started). The concentration of water and glycol-monomethyl ether is maintained by adding these materials as required. The resulting solution is filtered and a sample of it placed on a hot plate. The water and glycol-monomethyl ether are evaporated, leaving a resin which fuses and then cures to an insoluble, infusible stage.

If the procedure of the first paragraph of the example is repeated using 3.70 grams of epichlorohydrin, 3.28 grams of diphenyl ether-4,4'-disulfonamide and, instead of the sodium hydroxide, 1.38 grams of potassium carbonate in 8 cc. of water, a fusible resin that does not cure on the hot plate results. Similar results are achieved by using, instead of the potassium carbonate, an equivalent amount of triethanolamine or pyridine.

The following procedures show that the molar ratio of epichlorohydrin to base (as well as the molar ratio of epichlorohydrin to disulfonamide) should be controlled in order to produce a curable resin: Epichlorohydrin (0.93 gram), diphenyl ether-4,4'-disulfonamide (3.28 grams) and sodium hydroxide (0.4 gram in 8 cc. of water) are mixed and heated on a water bath to a temperature between about 75° C. and about 80° C. The temperature is maintained within the above-mentioned range for about 10 minutes, during which time resin precipitates from the solution. The resin is separated, and washed with hot water as described in the first paragraph of Example 2. The resin softens on a hot plate but does not cure.

The procedure of the preceding paragraph is repeated increasing the amount of water to 16 cc. and the amount of epichlorohydrin to 2.78 grams. Reaction at a temperature between about 75° C. and about 80° C. is continued for about 30 minutes. The resulting dried resin fuses on a hot plate but does not cure.

The procedure of the preceding paragraph is repeated increasing the amount of epichlorohydrin used to 3.70 grams. The resulting dried resin fuses when heated on a hot plate but does not cure.

EXAMPLE 4

Ten mixtures of a disulfonamide, epichlorohydrin, sodium hydroxide and water are prepared and heated, five to one temperature and the remaining five to a higher temperature. The amounts of the disulfonamide (3.28 grams of diphenyl ether-4,4'-disulfonamide), epichlorohydrin (2.78 grams) and water (8 cc.) are the same for each of the ten samples. The amount of sodium hydroxide added to each sample varies from 0.4 gram to 0.8 gram (0.4 gram, 0.5 gram, 0.6 gram, 0.7 gram and 0.8 gram, respectively, being added to each of two of the samples). One sample containing each of the five amounts of sodium hydroxide is heated at a temperature between about 55° C. and about 60° C., and one sample containing each of the five amounts is heated at a temperature between about 80° C. and about 100° C. The samples containing larger amounts of sodium hydroxide gel after a shorter reaction at a given temperature, and a sample heated at the higher temperature gels after a considerably shorter reaction time than a sample containing the same amount of sodium hydroxide heated at the lower temperature. In preparing all samples the sulfonamide, epichlorohydrin, water and sodium hydroxide are mixed and heated to a temperature within one or the other of the specified ranges. If the resin gels the time is noted; otherwise, the mixture is heated for a total of 30 minutes, separated and washed, as hereinbefore described, and tested for solubility in glycol-monoethyl ether and for curability (e. g., by placing a sample of the resin on a hot plate at a temperature of about 140° C.). In Table 1, below, the time after which each sample gels is reported; in the cases in which the resin does not gel after 30 minutes at the specified temperature the notation used is "does not gel." The resins that are soluble in glycol-monoethyl ether are stated to be "soluble," and those that cure on the hot plate at about 140° C. are said to be "curable."

*Table 1*

| Sample | Grams NaOH | Temperature of Reaction, °C. | Solution Gelled After— |
|---|---|---|---|
| A | 0.4 | 80–100 | Does not gel.[1] |
| B | 0.4 | 55–60 | Do.[1] |
| C | 0.5 | 80–100 | Do.[1] |
| D | 0.5 | 55–60 | Do.[1,2] |
| E | 0.6 | 80–100 | 3–5 minutes. |
| F | 0.6 | 55–60 | Does not gel.[1,2] |
| G | 0.7 | 80–100 | 3–5 minutes. |
| H | 0.7 | 55–60 | Does not gel.[1,2] |
| I | 0.8 | 80–100 | 3–5 minutes. |
| J | 0.8 | 55–60 | 30 minutes. |

[1] Yields a soluble resin.
[2] Yields a curable resin.

Four additional mixtures (herein called samples K, L, M and N) are prepared, using diphenyl ether-4,4'-disulfonamide (3.28 grams), water (8 cc.), a smaller amount of epichlorohydrin (1.85 grams) than that used for Samples A through J, and sodium hydroxide (0.5, 0.6, 0.7 and 0.8 gram, respectively). Each of these samples is heated to a temperature between about 55° C. and about 60° C.; resin precipitates from these samples within about 5 minutes after heating is started. Heating is continued and samples M and N gel about 12 minutes after heating is started, sample L gels about 25 minutes after heating is started; and sample K is not gelled 30 minutes after heating is started. Sample K is separated from the aqueous layer and washed with hot water, and a sample of the washed resin is found to cure on a hot plate at about 140° C.

The characteristics of samples A through M demonstrate that the ratios of epichlorohydrin to strong base that can be used to produce compositions of the invention depend upon other factors. Thus, in some instances, useful resins can be prepared, using a certain molar ratio of epichlorohydrin to base, by reacting the ingredients at a temperature between about 55° C. and about 60° C. whereas a useless gel results if the reaction is conducted at a temperature between about 80° C. and about 100° C.

EXAMPLE 5

Table 2 shows the time required to cure several samples of resins of the invention. The variations result from the additions of different amounts of alkaline agents. A 50 weight per cent glycol-monoethyl ether solution of an epichlorohydrinsulfonamide resin is prepared from diphenyl ether-4,4'-disulfonamide (164 grams), sodium hydroxide (30 grams in 60 cc. of water) and epichlorohydrin (139.3 grams). The reactants are heated to about 50° C. and held at about that temperature until approximately 30 minutes after resin begins to precipitate from the solution. The resin is separated, washed with hot water and dried by heating on a hot plate at a temperature of about 100° C. until the water is evaporated. Various alkaline agents are added to different samples of this resin solution, and the time in seconds required for the different samples to cure (on a hot plate maintained at a temperature of 140° C. ± 10° C.) is determined. The cure times given in Table 2 represent the results of a series of tests all performed on samples from the same resin solution, but on different days. It is believed that the resin selected for this series of tests cures slowly at room temperature, and that this slow cure is responsible for the variations in cure time at 0 per cent catalyst. Therefore, the results obtained with the different alkaline agents in any one of the specified percentages (i. e., the figures in any vertical column) are not necessarily comparable, but the results for any one alkaline agent, used in the different percentages, are comparable. The results of these determinations are presented in Table 2.

*Table 2*

| Catalyst | Percentage of Catalyst | | | |
|---|---|---|---|---|
| | 0 | 0.1 | 1 | 5 |
| | Gel Time | | | |
| NaOH | 110 | 105 | 75 | 68 |
| Piperazine | 92 | 75 | 26 | 12 |
| Piperidine | 100 | 75 | 53 | 34 |
| Sodium (in the form of a solution of 6 grams of sodium in 90 cc. of glycol-monoethyl ether) | 80 | 72 | 27 | 5 |
| Diethylenetriamine | 65 | 40 | 12 | 6 |
| Hexamethylenediamine | 60 | 29 | 12 | 6 |

EXAMPLE 6

A disulfonamide (4.72 grams of m-benzene disulfonamide) is dissolved in aqueous sodium hydroxide (1.6 grams of sodium hydroxide in 32 cc. of water); epichorohydrin (7.4 grams) is added; the mixture is warmed to a temperature between about 70° C. and about 75° C.; and is held at a temperature within this range for about 15 minutes. The resinous layer is separated by decantation, is washed thoroughly with hot water, and is dried by heating on a hot plate until all the water is vaporized.

A 2 gram sample of the resin produced by the procedure of the preceding paragraph is dissolved in acetone (4 grams), and the resulting solution is used to impregnate cellulose fluff (1.5 grams). The resulting material is dried at a temperature of about 75° C. for about 15 minutes. The larger pieces of dried sample are broken (e. g., with mortar and pestle), and the resulting material is pressed into a pill. A portion of the pill is placed in one cavity of a five cavity button mold (the other cavities are left empty) in a 2750 pound compression press and cured for about 15 minutes at about 300° F. A satisfactory molding is not obtained because most of the resin is squeezed from the cellulose before it is cured. The remainder of the pill is broken into three sections (for convenience hereinafter referred to as samples I, II and III). Sample I is heated at 140° C. for 3 minutes; sample II for 6 minutes; and sample III for 9 minutes. A satisfactory molding about 0.7 inch in diameter and about 0.05 inch thick is formed when sample III is cured for about 10 minutes in the button mold, as described above.

A sample (2 grams) of the resin produced by the procedure of the first paragraph of the example is dissolved in acetone (8 grams) and diethylenetriamine (0.04 gram) is added to the solution. Cellulose fluff (1.5 grams) is impregnated with this solution and the resulting material is dried by heating at 75° C. for about 15 minutes. The dried material is comminuted and pilled as described in the preceding paragraph and molded in a button mold. Satisfactory moldings are produced using a cure time of from 2 to 4 minutes with a mold temperature of about 300° F. A glycol-monomethyl ether solution (50 weight per cent solids) of the resin produced by the procedure of the first paragraph of the example is filmed onto a glass plate, and the resulting film is cured by heating for 30 minutes at about 300° F. The resulting film is resistant to action of glacial acetic acid, glycol-monomethyl ether or 10 weight per cent aqueous sodium hydroxide.

EXAMPLE 7

A disulfonamide (110 grams of diphenyl ether-4,4'-disulfonamide) is dissolved in aqueous sodium hydroxide (21.4 grams of NaOH in 5 cc. of water), and the resulting solution is heated to a temperature between about 55° C. and about 60° C. The flask containing this solution is placed in a water bath at a temperature between about 55° C. and about 60° C. and epichlorohydrin (93.8 grams) is added. The flask is kept in the water bath, and the mixture is stirred for about 1 hour. The resin is separated from the aqueous layer by decantation and is then washed with hot water. The resulting wet resin (190 grams) is mixed for about 30 minutes in a small Banbury mixer (the mixer has a capacity between about 200 and about 400 cc.) with 100 grams of alpha-cellulose fluff. The resulting material is dried in an electric oven for about 90 minutes at 70° C. and is then ground in a No. 1 Wiley mill using a screen having about eight openings per square inch, each opening being circular and having a diameter of about $\frac{3}{16}$ inch. The material from the Wiley mill (220 grams) is further ground in a jar mill having a capacity of about one gallon (using about five pounds of porcelain balls having diameters between about ½ inch and about 1 inch) for about 15 hours. Zinc stearate (1 gram) is added to the jar mill and grinding is continued for about 30 minutes. The resulting powder is compressed into pills and molded (with virtually no gassing) into disks, each of which has a diameter of about 2 inches and a thickness of about 0.06 inch, and weighs about 5.7 grams. These moldings are obtained using a mold temperature of about 308° F. in a thirty ton (2-cavity mold) hydraulic press, using cure times of 5, 8, 10 and 15 minutes. The disks are weighed, immersed in boiling water for about 1 hour, and then weighed again. The weight of each disk before boiling, and the difference in the weight after boiling (increase) are shown in Table 3 as "weight of disk" and "absorption," respectively. Bars (6" x ½" x ¼") are also molded from the material using a mold temperature of about 308° F. in a twenty-nine ton (2-cavity mold) hydraulic press, using cure times of 10 and 15 minutes. "Flexural strength," as reported in Table 3, is determined, using a section of such a bar having a span of 3 inches and a rate of advance of 0.10 inch per minute. "Compressive strength," as reported in Table 3, is determined using a section of such a bar 1¼ inches long. The sample is placed so that the 1¼ inch dimension is the height, and a rate of advance of 0.05 inch per minute is used.

Table 3

Water Absorptions

| Cure | Weight of Disc, grams | Absorption, grams |
| --- | --- | --- |
| 5 minutes | 5.669 | 0.486 |
| 8 minutes | 5.649 | 0.471 |
| 10 minutes | 5.671 | 0.462 |
| 15 minutes | 5.672 | 0.450 |

FLEXURAL STRENGTH 10 minutes _____ 7,640 pounds per square inch.
15 minutes _____ 7,500 pounds per square inch.

COMPRESSIVE STRENGTH 10 minutes _____ 22,900 pounds per square inch.
15 minutes _____ 23,300 pounds per square inch.

EXAMPLE 8

Diphenyl ether - 4,4' - disulfonamide (3.28 grams) is dissolved in an aqueous solution of a strong base (1.6 grams of sodium hydroxide in 15 cc. of water), and alpha, gamma-glycerol dichlorohydrin (3.87 grams) is added to the solution. The resulting mixture is warmed to a temperature between about 60° C. and about 65° C. The temperature of the mixture is maintained within this range until a resin precipitates from the solution (from about 15 to about 30 minutes); the resin is then separated and washed as described in the first paragraph of Example 2. A sample of the washed resin fuses and then cures on a hot plate which is at a temperature of about 140° C.

If the procedure of the preceding paragraph is repeated, using only 0.6 gram of sodium hydroxide, a permanently fusible resin results.

EXAMPLE 9

A disulfonamide (100 grams of diphenyl ether-4,4'-disulfonamide) is dissolved in aqueous sodium hydroxide (18.3 grams of NaOH in 480 cc. of water), and epichlorohydrin (84 grams) is added to the solution. The resulting mixture is heated at a temperature between about 55° C. and about 67° C. for thirty minutes. The resin is separated from the aqueous layer, washed with hot water, and dried by heating (with stirring) until the temperature of the resin is about 100° C. and the water is all vaporized. A sample of the resulting resin (50 grams) is dissolved in glycol-monomethyl ether (50 grams). The resulting resin solution (having a Gardner-Holdt viscosity of U) is filmed onto primed glass plates and cured by heating at 300° F. in an electric oven for about thirty minutes. The glass plates are primed according to the following procedure:

A primer is prepared by mixing an alkyd resin (one part by weight of a resin derived from 30 weight per cent of linseed oil, 13 weight per cent of rosin, 2 weight per cent of a phenol-formaldehyde resin and 55 weight per cent of a glycerol phthalate) and a pigment composition (two parts by weight of a pigment composition which is 50 parts by weight of talc, 25 parts by weight of calcium carbonate and 25 parts by weight of "Micalith G"). "Micalith G" is a white pigment containing barium sulfate, zinc sulfide, zinc oxide and aluminum silicates. A film of this alkyd primer is spread on the glass plates and cured by heating at 300° F. in an electric oven for about thirty minutes.

The cured films of the epichlorohydrin-sulfonamide resin on these primed glass plates are subjected to the action of aqueous caustic solutions (3 weight per cent and 10 weight per cent) and to the action of water for four hour periods. The films are slightly softened by all three agents, but recover (i. e., return to a hard condition not apparently different from that of the films before immersion) from the water and 3 weight per cent caustic solutions upon drying. The film that has been immersed in a 10 weight per cent caustic solution is slightly soft when wet. When dried, it no longer sticks to the primer.

Having described the invention, I claim:

1. An infusible product of the condensation of from 0.5 to 3 mols of epichlorohydrin with a disulfonamide that contains 2 gram atoms of hydrogen atoms attached to sulfonamide nitrogen atoms, wherein the epichlorohydrin constituent (1) has the formula

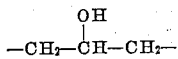

(2) forms a bridge in the polymer structure directly connecting two sulfonamide nitrogen atoms by replacement of a hydrogen atom on each of such nitrogen atoms, and (3) replaces at least three of such hydrogen atoms per sulfonamide molecule.

2. A product of the condensation of from 0.5 to 3 mols of epichlorohydrin with a quantity of a disulfonamide contains 2 gram atoms of hydrogen atoms attached to sulfonamide nitrogen atoms, wherein the epichlorohydrin constituent is incorporated in the polymer structure as (A) radicals having the formula

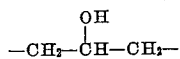

which form bridges in the polymer structure each directly connecting two sulfonamide nitrogen atoms by replacement of a hydrogen atom on each of such nitrogen atoms, the number of such radicals being at least sufficient to render the polymer insoluble in aqueous alkali, and (B) radicals having formulas of the class consisting of

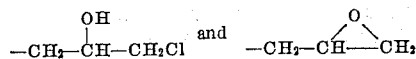

each of which is connected directly to a sulfonamide nitrogen atom by replacement of a hydrogen atom on the nitrogen atom; the disulfonamide molecule from which the disulfonamide constituent is derived having at least three replaceable hydrogen atoms attached to sulfonamide nitrogen atoms.

3. An epichlorohydrin-disulfonamide condensation polymer as claimed in claim 2 wherein the number of (A) radicals is insufficient to render the polymer infusible.

4. A thermosetting product of the condensation of from 0.5 to 3 mols of epichlorohydrin with a quantity of a disulfonamide that contains 2 gram atoms of hydrogen atoms attached to sulfonamide nitrogen atoms, whose polymer structure comprises (A) recurring units, incorporated in a polymer chain, having the formula

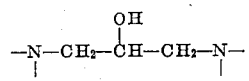

each of which forms a bridge connecting directly two sulfonyl radicals in two different disulfonamide molecules, the number of such recurring units being at least sufficient to render the polymer insoluble in aqueous alkali but insufficient to render the polymer infusible and (B) recurring units, attached to sulfonyl radicals in the disulfonamide molecules, having a formula of the class consisting of

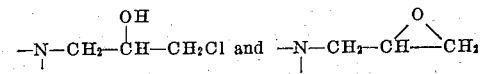

5. A fast-curing sulfonamide resin that is a product of the condensation of from 0.5 to 3 mols of epichlorohydrin with a quantity of a disulfonamide that contains 2 gram atoms of hydrogen atoms attached to sulfonamide nitrogen atoms, whose polymer structure comprises disulfonamide units having the formula

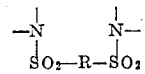

wherein R is an organic radical any atoms of which other than hydrogen and carbon are ether oxygen atoms, not more than one of the four free valences of each of such units being connected to a monovalent hydrocarbon radical, some of the free valences of such units being connected to hydrogen, some of such free valences being connected to radicals having formulas of the class consisting of

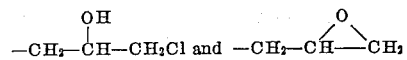

and such disulfonamide units being connected together through radicals having the formula

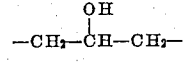

which radicals satisfy the remainder of such free valences.

6. A fast-curing sulfonamide resin as claimed in claim 5 wherein each of the two SO2 groups in the structural formula is attached to an aromatic nucleus.

7. A fast-curing sulfonamide resin as claimed in claim 6 wherein the divalent radical to which the two SO2 groups are attached contains an ether linkage.

8. A fast-curing sulfonamide resin as claimed in claim 7 wherein the two SO2 groups are attached to two different aromatic nuclei.

9. A fast-curing sulfonamide resin as claimed in claim 8 wherein the two aromatic nuclei are connected through an ether linkage.

10. A fast-curing sulfonamide resin that is a product of the condensation of from 0.5 to 3 mols of epichlorohydrin with a quantity of a disulfonamide that contains 2 gram atoms of hydrogen atoms attached to sulfonamide nitrogen atoms, whose polymer structure comprises disulfonamide units having the formula

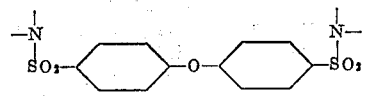

some of the free valences of such units being connected to hydrogen, some of such free valences being connected to radicals having formulas of the class consisting of
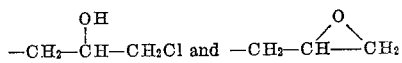
and the remainder of such free valences being satisfied by radicals having the formula
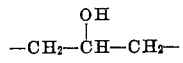
which connect together such units.
JOHN KENSON SIMONS.
References Cited in the file of this patent
UNITED STATES PATENTS
| Number | Name | Date |
|---|---|---|
| 2,040,212 | Orthner et al. | May 12, 1936 |
| 2,138,934 | Moss | Dec. 6, 1938 |
| 2,510,886 | Greenlee | June 6, 1950 |